US012450460B2

(12) United States Patent
Barkan et al.

(10) Patent No.: US 12,450,460 B2
(45) Date of Patent: Oct. 21, 2025

(54) METHOD TO LIMIT RANGE OF A BARCODE SCANNER

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); David P. Goren, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/524,425

(22) Filed: Nov. 30, 2023

(65) Prior Publication Data

US 2025/0181863 A1  Jun. 5, 2025

(51) Int. Cl.
*G06K 7/14* (2006.01)
*G06K 19/06* (2006.01)

(52) U.S. Cl.
CPC ......... *G06K 7/146* (2013.01); *G06K 19/0614* (2013.01)

(58) Field of Classification Search
CPC ............................ G06K 7/146; G06K 19/0614
See application file for complete search history.

(56) References Cited

U.S. PATENT DOCUMENTS

| | | | | |
|---|---|---|---|---|
| 11,363,209 B1* | 6/2022 | Gajjala | ................ | G06V 10/25 |
| 11,438,518 B1* | 9/2022 | Barish | .................... | H04N 23/67 |
| 2013/0016222 A1* | 1/2013 | Jiang | .................... | H04N 17/002 |
| | | | | 348/E17.002 |
| 2013/0129203 A1* | 5/2013 | Smith | ................ | G06K 7/10821 |
| | | | | 382/162 |
| 2015/0269403 A1* | 9/2015 | Lei | ..................... | G06K 7/10792 |
| | | | | 235/462.24 |
| 2017/0064229 A1* | 3/2017 | Wable | .................... | H04N 25/70 |
| 2017/0357035 A1* | 12/2017 | Nunnink | ................ | G02B 7/028 |
| 2018/0350106 A1* | 12/2018 | Kasilya Sudarsan | ........ | |
| | | | | H04N 23/633 |
| 2019/0034681 A1* | 1/2019 | Ren | .......................... | G06K 7/12 |
| 2020/0202094 A1* | 6/2020 | D'Ercoli | ............ | G06K 7/10544 |
| 2021/0133410 A1* | 5/2021 | Wang | ................ | G06K 7/10801 |
| 2021/0152791 A1* | 5/2021 | Bikumandla | ........ | H04N 25/131 |
| 2022/0366542 A1* | 11/2022 | Toyohara | ............. | H04N 23/675 |

FOREIGN PATENT DOCUMENTS

| | | | | |
|---|---|---|---|---|
| EP | 2919056 A1 * | 9/2015 | ......... | G02B 27/0075 |
| WO | WO-2021201993 A1 * | 10/2021 | ............. | G11B 27/34 |

* cited by examiner

*Primary Examiner* — Tuyen K Vo
(74) *Attorney, Agent, or Firm* — Yuri Astvatsaturov

(57) ABSTRACT

Imaging devices, systems, and methods for determining whether an object is within range to be decoded based on a sharpness of the object in a captured image are described herein. An example device includes: an imaging assembly; and a computer-readable media storing machine readable instructions that, when executed, cause the imaging device to: (i) capture, using the imaging assembly, the image data of the indicia; (ii) calculate, using at least an element of the indicia, a sharpness score for the indicia; (iii) determine, based on the sharpness score, whether the indicia is within a predetermined decode operation range; (iv) when the distance of the indicia is within the predetermined decode operation range, perform a decode operation on the indicia; and (v) when the distance of the indicia is not within the predetermined decode operation range, refrain from performing the decode operation on the indicia.

3 Claims, 9 Drawing Sheets

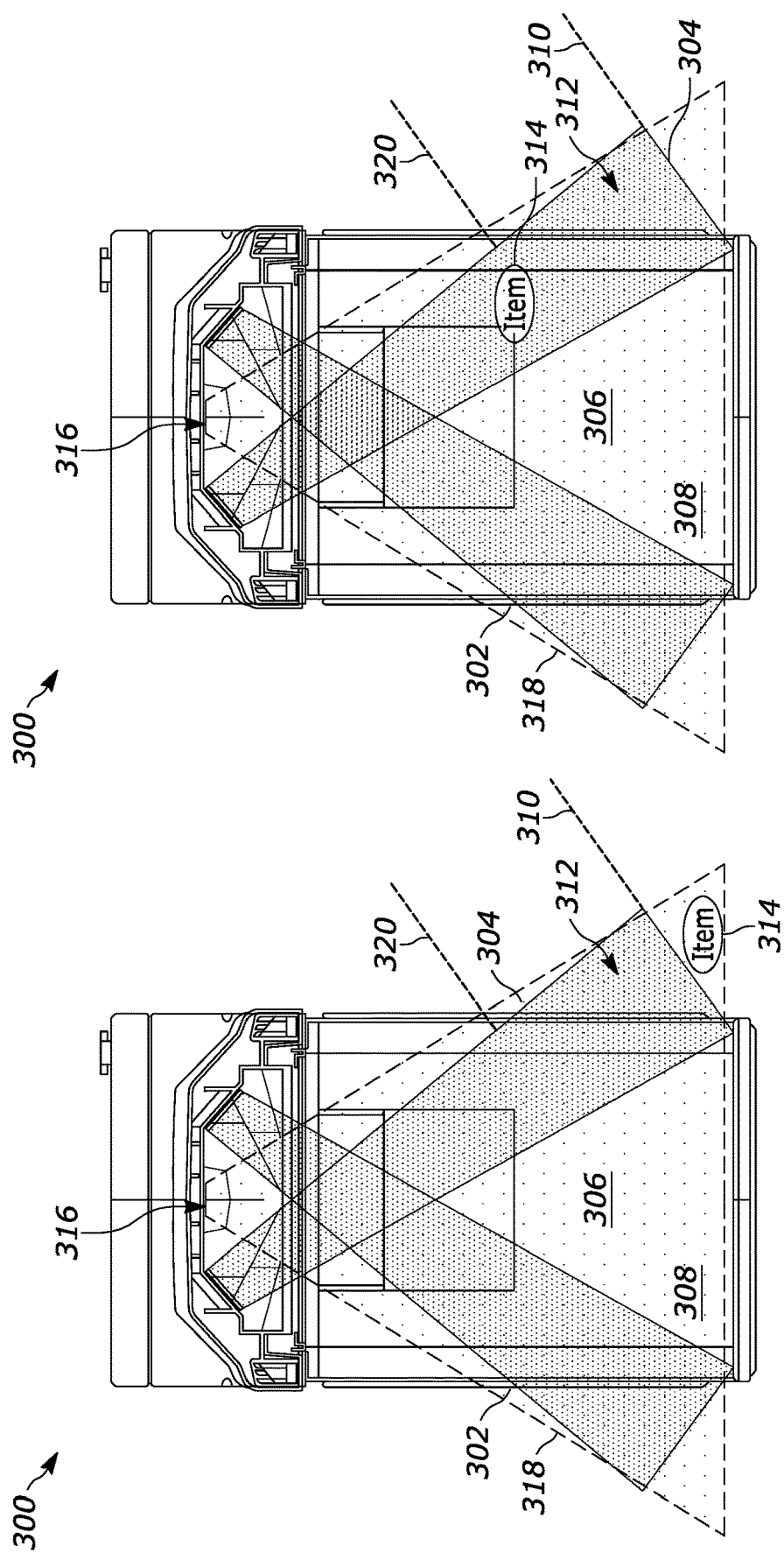

METHOD TO LIMIT RANGE OF A BARCODE SCANNER

BACKGROUND

Barcode reading systems have long been used to capture barcode data, which is then used to look up information regarding the item in question. However, as traditional systems improve the imaging and capturing processes, the range for potential capture expands beyond the range accounted for in such traditional systems. As such, an unwary user may accidentally bring an item into an imaging device's scan range, causing the imaging device to attempt to scan the item without a user being aware and/or when the imaging device is likely to misread the barcode and register an incorrect item. Moreover, traditional systems may not only accidentally detect an incorrect item, but they may be impacted by larger quantities of noise in the signal-to-noise ratio of a captured image. For example, ambient lighting may have a duty cycle that can overlap and increase or decrease the signal and/or lead to double decodes. In particular, the imaging device may detect the barcode in proper circumstances in addition to incorrect circumstances and/or for a short enough period that a same symbol timeout does not occur, leading to additional incorrect costs for a user. Attempts to address such concerns may require additional components, such as illumination or aiming components, which may increase the overall drain on the system resources and power usage. As such, a system that is able detect when an object is within a predetermined decode range is desirable.

SUMMARY

In an embodiment, an imaging device for determining whether an object is within range to be decoded based on a sharpness of the object in a captured image is provided. The imaging device includes: an imaging assembly; and a computer-readable media storing machine readable instructions that, when executed, cause the imaging device to: (i) capture, using the imaging assembly, the image data of the indicia; (ii) calculate, using at least an element of the indicia, a sharpness score for the indicia; (iii) determine, based on the sharpness score, whether the indicia is within a predetermined decode operation range; (iv) when the distance of the indicia is within the predetermined decode operation range, perform a decode operation on the indicia; and (v) when the distance of the indicia is not within the predetermined decode operation range, refrain from performing the decode operation on the indicia.

In a variation of this embodiment, the computer-readable media further stores additional instructions that, when executed, cause the imaging device to: select the element of the indicia responsive to generating a decoded indicia by decoding the indicia; wherein performing the decode operation includes performing an operation using the decoded indicia.

In another variation of the embodiment, selecting the element of the indicia is based on an indicia type of the decoded indicia.

In another variation of the embodiment, the element of the indicia is at least one of: (i) a bar of a 1-dimensional indicia, (ii) a bar of a 2-dimensional indicia, (iii) a finder pattern of a 2-dimensional indicia, or (iv) a predetermined symbol of a 2-dimensional indicia.

In another variation of the embodiment, the element of the indicia is a selected element of the one or more elements of the indicia, and the computer-readable media stores additional machine readable instructions that, when executed, cause the imaging device to: select the selected element such that the selected element has a highest modulation of one or more modulations associated with the one or more elements.

In yet another variation of the embodiment, the element of the indicia is a second element of the indicia and the computer-readable media stores additional instructions that, when executed, further cause the imaging device to: select a first element of the indicia for calculating the sharpness score, wherein the first element is different than the second element; determine that the first element is too small for calculating the sharpness score; and in response, discard the first image data without performing the decode operation.

In still yet another variation of the embodiment, calculating the sharpness score includes: performing, using the at least the element of the indicia, a modulated transfer function to generate a result of the modulated transfer function; and calculating, using the modulated transfer function, the sharpness score.

In another variation of the embodiment, determining whether the indicia is within a predetermined decode operation range includes: determining, using the sharpness score, a distance from the imaging assembly to the indicia.

In yet another variation, the modulated transfer function is calculated using a slanted edge method.

In yet another variation, determining the distance of the indicia is further based on a position of the indicia in the FOV.

In still yet another variation, the computer-readable media stores additional instructions that, when executed, further cause the imaging device to: determine a contrast amplitude between two colors of the indicia; wherein determining the distance of the indicia is further based on the contrast amplitude.

In another variation, the computer-readable media stores additional instructions that, when executed, further cause the imaging device to: determine, based at least on the distance of the indicia, a density value for the indicia; and store the density value for the indicia in an indicia density database.

In still another variation, determining whether the distance of the indicia is within the predetermined decode operation range is further based on the density value for the indicia.

In yet another variation, the computer-readable media stores additional instructions that, when executed, further cause the imaging device to: determine a contrast amplitude between two colors of the indicia; and when the indicia is not within the predetermined decode operation range: determine whether the contrast amplitude is above a predetermined threshold value; and when the contrast amplitude is above the predetermined threshold value, perform the decode operation; wherein refraining from performing the decode operation is responsive to determining that the contrast amplitude is not above the predetermined threshold value.

In another embodiment, a method for determining whether an object is within range to be decoded based on a sharpness of the object in a captured image is provided. The method includes: (i) capturing, by one or more processors of the imaging device and via the imaging assembly, the image data of the indicia; (ii) calculating, by the one or more processors and using at least an element of the indicia, a sharpness score for the indicia; (iii) determining, by the one or more processors and based on the sharpness score, whether the indicia is within a predetermined decode operation range; (iv) when the distance of the indicia is within the predetermined decode operation range, performing, by the one or more processors, a decode operation on the indicia; and (v) when the distance of the indicia is not within the predetermined decode operation range, refraining, by the one or more processors, from performing the decode operation on the indicia.

In a variation of the embodiment, the method further comprises selecting the element of the indicia responsive to generating a decoded indicia by decoding the indicia; and wherein performing the decode operation includes performing an operation using the decoded indicia.

In another variation of the embodiment, selecting the element of the indicia is based on an indicia type of the decoded indicia.

In yet another variation of the embodiment, the element of the indicia is at least one of: (i) a bar of a 1-dimensional indicia, (ii) a bar of a 2-dimensional indicia, (iii) a finder pattern of a 2-dimensional indicia, or (iv) a predetermined symbol of a 2-dimensional indicia.

In still another variation of the embodiment, the element of the indicia is a selected element of the one or more elements of the indicia, and the method further comprises: selecting the selected element such that the selected element has a highest modulation of one or more modulations associated with the one or more elements.

In still yet another variation of the embodiment, the element of the indicia is a second element of the indicia and the method further includes: selecting a first element of the indicia for calculating the sharpness score, wherein the first element is different than the second element; determining that the first element is too small for calculating the sharpness score; and in response, discarding the first image data without performing the decode operation.

In another variation of the embodiment, calculating the sharpness score includes: performing, using the at least the element of the indicia, a modulated transfer function to generate a result of the modulated transfer function; and calculating, using the modulated transfer function, the sharpness score.

In yet another variation of the embodiment, determining whether the indicia is within a predetermined decode operation range includes: calculating, using the sharpness score, a distance from the imaging assembly to the indicia.

In still another variation of the embodiment, the modulated transfer function is calculated using a slanted edge method.

In still yet another variation of the embodiment, determining the distance of the indicia is further based on a position of the indicia in the FOV.

In another variation of the embodiment, the method further includes: determining a contrast amplitude between two colors of the indicia; wherein determining the distance of the indicia is further based on the contrast amplitude.

In yet another variation of the embodiment, the method further includes: determining, based at least on the distance of the indicia, a density value for the indicia; and storing the density value for the indicia in an indicia density database.

In still another variation of the embodiment, determining whether the distance of the indicia is within the predetermined decode operation range is further based on the density value for the indicia.

In still another variation of the embodiment, the method further includes: determining a contrast amplitude between two colors of the indicia; and when the indicia is not within the predetermined decode operation range: determining whether the contrast amplitude is above a predetermined threshold value; and when the contrast amplitude is above the predetermined threshold value, performing the decode operation; wherein refraining from performing the decode operation is responsive to determining that the contrast amplitude is not above the predetermined threshold value.

In yet another embodiment, an imaging device for determining whether an object is within range to be decoded based on chromatic aberration(s) is provided. The imaging device includes: an imaging assembly; and a computer-readable media storing machine readable instructions that, when executed, cause the imaging device to: (i) capture, using the imaging assembly, the image data of the indicia; (ii) determine a first position of an element of the indicia in the FOV according to a first light wavelength and a second position of the element in the FOV according to a second light wavelength; (iii) calculate, based on the first position and the second position, a position shift of the element due to chromatic aberration; (iv) determine, based on the position shift, whether the indicia is within a predetermined decode operation range; (v) when the distance of the indicia is within the predetermined decode operation range, perform a decode operation on the indicia; and (vi) when the distance of the indicia is not within the predetermined decode operation range, refrain from performing the decode operation on the indicia.

In a variation of this embodiment, the imaging assembly includes a color imaging sensor, and the first light wavelength and the second light wavelength are received in a single frame.

In another variation of the embodiment, the imaging assembly includes a monochrome imaging sensor, the first light wavelength is of a first received light received in a first frame, and the second light wavelength is of a second received light received in a second frame.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 3A illustrates a top-down view of an example bioptic barcode reader similar to that of FIG. 1A, wherein an item is outside a scan range of the barcode reader;

FIG. 3B illustrates a top-down view of the example bioptic barcode reader of FIG. 3A, but in which the item is within the scan range of the barcode reader;

Figure 1A:
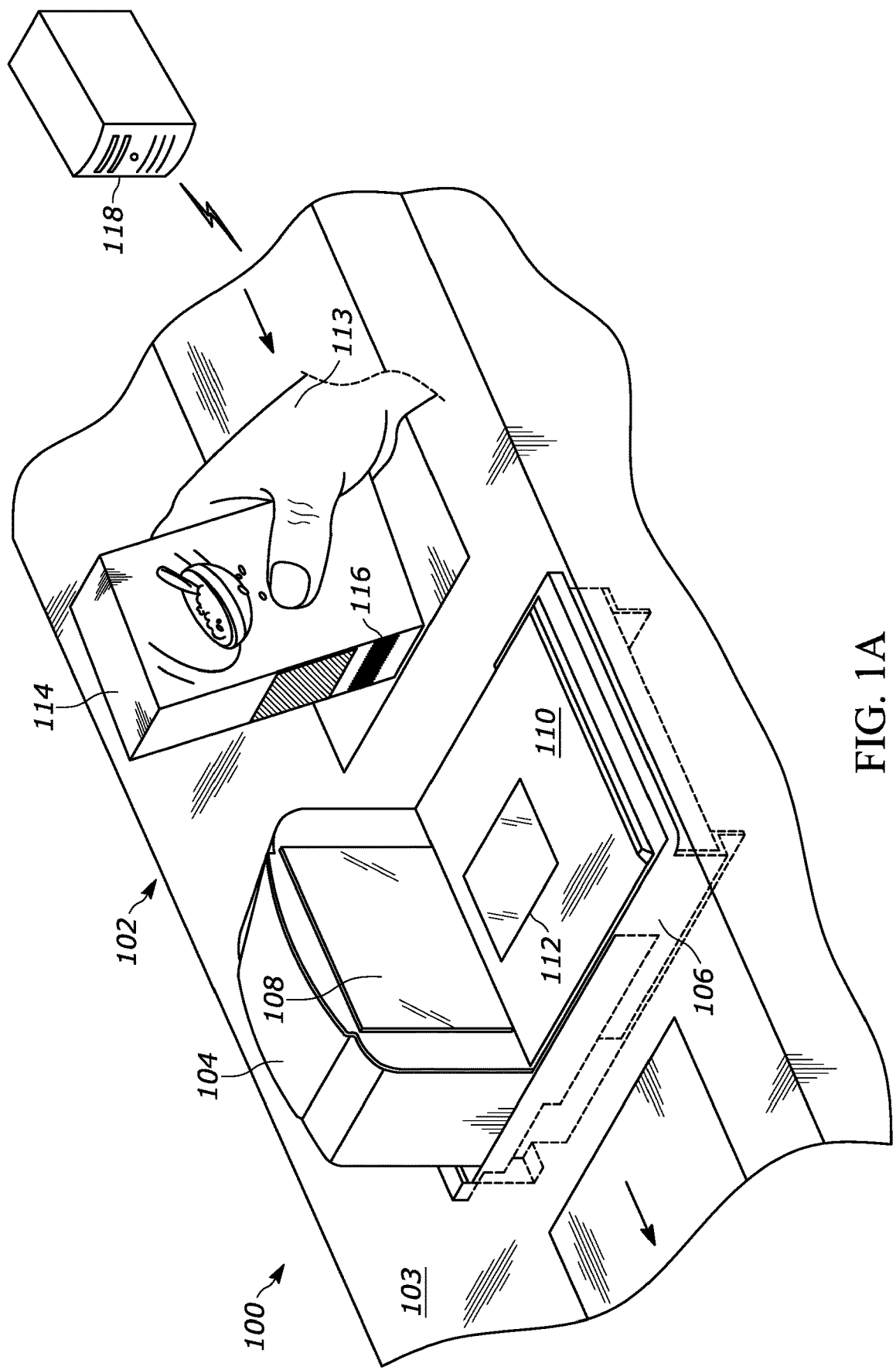
FIG. 1A illustrates an isometric view of an example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example imaging devices disclosed herein utilize an existing assembly in an imaging device in the form of an imaging assembly to capture an image for the device to determine a sharpness (e.g., blurriness) and/or position shift of an object within a field of view (FOV) of the device. By determining the sharpness of an object in an image, the imaging device is able to successfully determine whether the object is within a predetermined decoding range. If the object is within the decoding range, the imaging device can determine to properly decode indicia associated with the object. If the object is not within the decode range, the imaging device can determine to refrain from decoding any indicia associated with the object. As such, an imaging device implementing the techniques described herein avoids bad or incorrect scans, accidental scans, double scans, etc.

Referring to FIG. 1A, shown therein is an example imaging device embodied in a bi-optic indicia reader 100. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion), collectively referred to as a housing. The upper housing 104 can be characterized by an optically transmissive window 108 positioned therein along a generally vertical (or upright) plane and one or more field of view (FOV) which passes through the window 108 and extends in a generally lateral direction. In some examples, a reference to a generally upright window shall be understood to mean a window inclined at an angle of up to 35 degrees relative to a vertical plane. The lower housing 106 can be characterized by a weigh platter 110 or a cover that includes an optically transmissive window 112 positioned therein along a generally horizontal (also referred to as a transverse) plane and one or more FOV which passes through the window 112 and extends in a generally upward direction. In some examples, a reference to a generally horizontal window shall be understood to mean a window inclined at an angle of up to 25 degrees relative to a horizontal plane. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100 (and its respective modules and/or assemblies), and corresponding data (e.g., the payload of the indicia) is transmitted to a communicatively coupled host 118 (commonly comprised of a point of sale (POS) terminal).

Figure 1C:
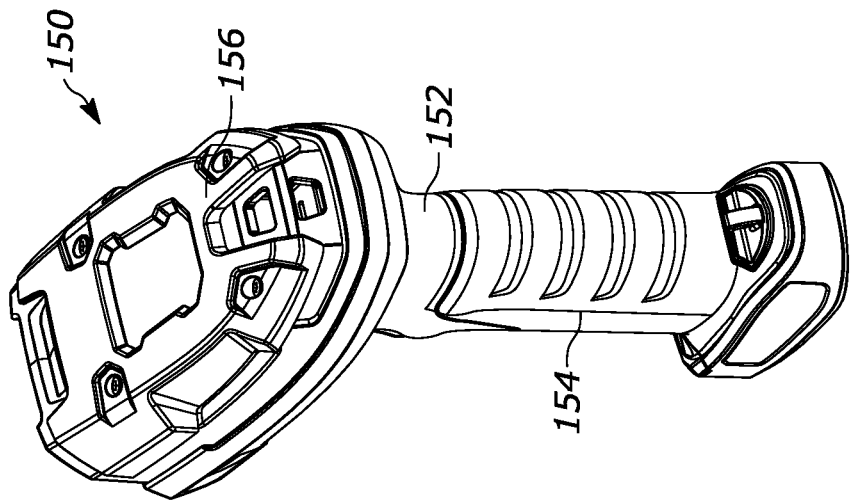
FIG. 1C illustrates a back perspective view of the handheld barcode reader of FIG. 1B.
Figure 1B:
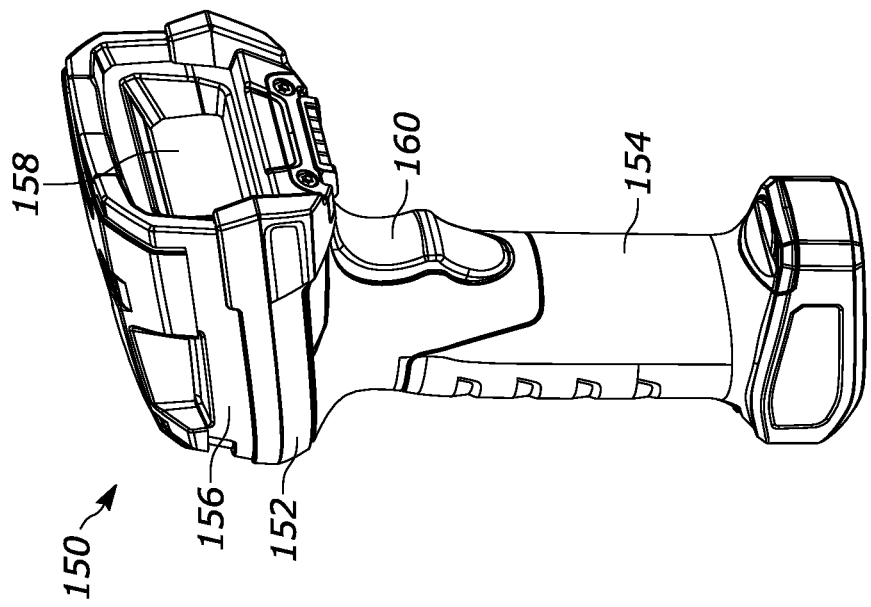
FIG. 1B illustrates a front perspective view of an example handheld barcode reader as an alternative example imaging device to that of FIG. 1A.

Referring next to FIGS. 1B and 1C, illustrated therein is another exemplary imaging device. In particular, handheld imaging device 150 has a housing 152 with a handle portion 154, also referred to as a handle 154, and a head portion 156, also referred to as a scanning head 156. The head portion 156 includes a window 158 and is configured to be positioned on the top of the handle portion 154. The handle portion 154 is configured to be gripped by a reader user and includes a trigger 160 for activation by the user. Optionally included in an embodiment is also a base (not shown), also referred to as a base portion, that may be attached to the handle portion 154 opposite the head portion 156, and is configured to stand on a surface and support the housing 152 in a generally upright position. The handheld imaging device 150 can be used in a hands-free mode as a stationary workstation when it is placed on a countertop or other workstation surface. The handheld imaging device 150 can also be used in a handheld mode when it is picked up off the countertop or base station, and held in an operator's hand. In the hands-free mode, products can be slid, swiped past, or presented to the window 158 for the reader to initiate barcode reading operations. In the handheld mode, the barcode reader 150 can be moved towards a barcode on a product, and the trigger 160 can be manually depressed to initiate imaging of the barcode.

Other implementations may provide only handheld or only hands-free configurations. In the embodiment of FIGS. 1A and 1B, the handheld imaging device 150 is ergonomically configured for a user's hand, though other configurations may be utilized as understood by those of ordinary skill in the art. As shown, the lower handle 154 extends below and rearwardly away from the body 152 along a centroidal axis obliquely angled relative to a central FOV axis of a FOV of an imaging assembly within the scanning head 152.

Figure 2:
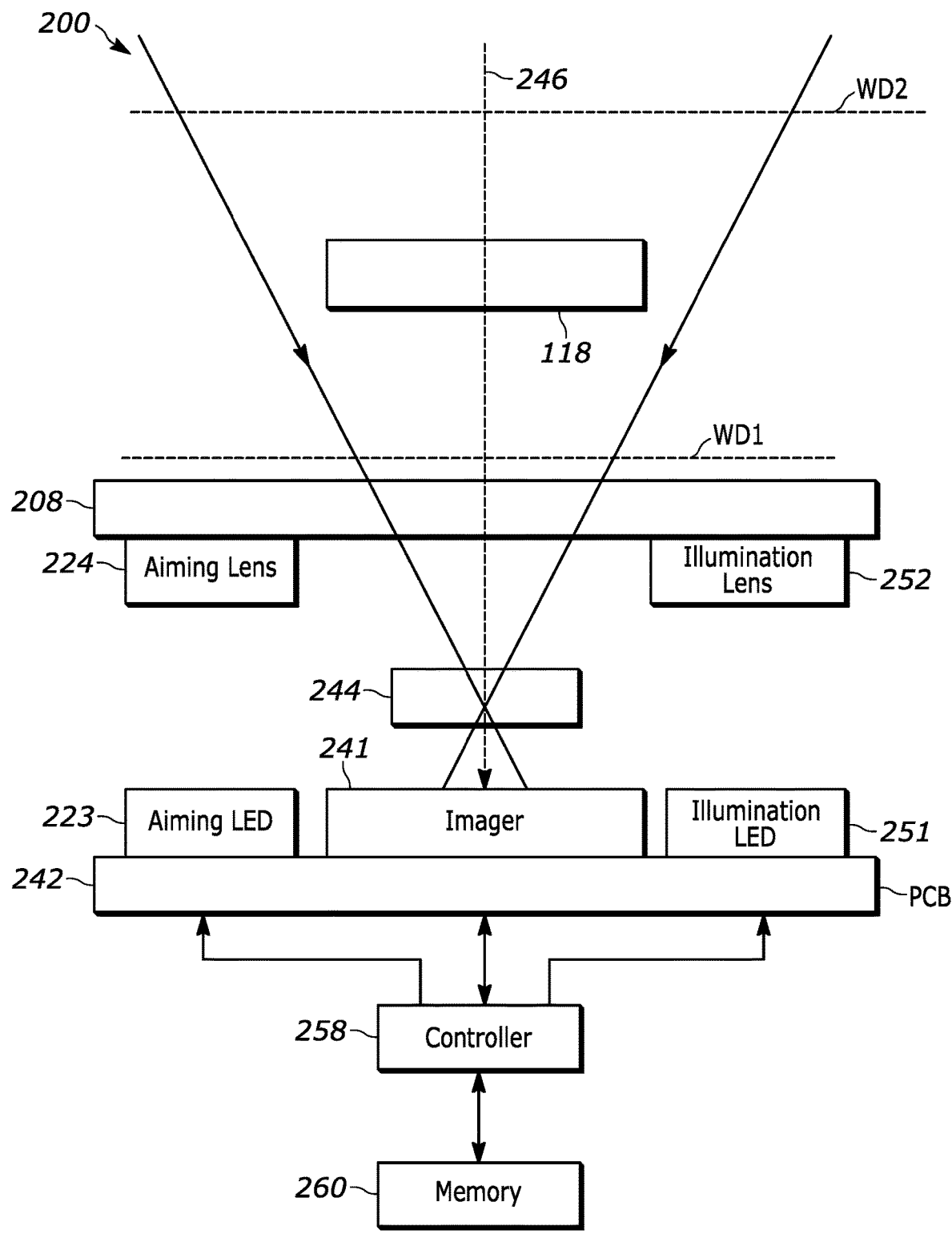
FIG. 2 illustrates a block diagram of an example imaging device such as the example barcode readers of FIGS. 1A-1C.

In some embodiments, an imaging assembly includes a light-detecting sensor or imager operatively coupled to, or mounted on, a printed circuit board (PCB) in the handheld imaging device 150 as shown in FIG. 2. In further embodiments, an illuminating light assembly is also mounted in the handheld imaging device 150. The illuminating light assembly may include an illumination light source and at least one illumination lens, configured to generate a substantially uniform distributed illumination pattern of illumination light on and along an object to be read by image capture, as described below with regard to FIG. 2.

Referring next to FIG. 2, a block diagram of an example architecture for an imaging device such as bioptic indicia reader 100 is shown. For at least some of the reader implementations, an imaging assembly of the imaging device 200 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imager 241 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to sufficiently illuminate an object 118 and/or an indicia of the object 118 (e.g., for image capture). An aiming light assembly instead provides a defined illumination pattern (e.g., to assist a user in visualizing some portion of the FOV). Similarly, in some implementations, the illumination light source 251 and the aiming light source 223 are active at different, non-overlapping times. For example, the illumination light source 251 may be active on frames when image data is being captured and the aiming light source 223 may be active on frames when image data is not being captured (e.g., to avoid interference with the content of the image data).

In further implementations, the imaging device 200 may additionally emit an auditory cue, such as a chime, beep, message, etc. In still further implementations, the imaging device 200 may provide haptic feedback to a user, such as vibration (e.g., a single vibration, vibrating in a predetermined pattern, vibrating synchronized with flashing, etc.).

Further, the imager 241, the illumination source 251, and the aiming source 223 are operatively connected to a controller or programmed controller 258 (e.g., a microprocessor facilitating operations of the other components of imaging device 200) operative for controlling the operation of these components. In some implementations, the controller 258 functions as or is communicatively coupled to a vision application processor for receiving, processing, and/or analyzing the image data captured by the imager 241.

A memory 260 is connected and accessible to the controller 258. Preferably, the controller 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not co-axial with the central FOV axis).

In the example of FIGS. 3A and 3B, the illumination assembly 316 emits a structured light over the structured light illumination field 318 which at least partially overlaps with each FOV 302 and 304. In this manner, whenever item 314 (e.g., object 118) ends up being positioned within the FOV 302, 304 in the product-scanning region 306 or in the outer regions 312, that item can be illuminated by the structured light. To help determine if the item is within the product-scanning region 306, the processor of the indicia reader can analyze image data across the FOVs 302, 304, and specifically the appearance of the structured light, to determine a distance value of the item. In some instances, the structured light pattern includes a plurality of vertical lines, where the imager checks the distance between the lines as they appear on an item. It could also be a grid or any other pattern that allows for a detection of elements of a visual pattern appearing in a FOV. In this example, the preferred embodiment may have the structured light source close to the outbound imaging axis (the boundary) of each FOV. With the structured light field of illumination being emitted at a different angle than the imaging FOV, the distance between the pattern elements (like the bars) changes over distance as observed through the FOV. Upon determining the depth value, a further determination can be made as to whether the item is positioned within or outside the product-scanning region. In some implementations, the imaging system 300 is configured to decode an item when over a platter (e.g., the product-scanning region is the region over the platter) and cut off the FOV outside the platter. In some such implementations, the imaging system 300 determines whether an item is within the product-scanning region as described herein (e.g., based on sharpness as described with regard to FIG. 5).

For example, if the depth value indicates that the item is positioned past the distance indicated by line 310 as is shown in FIG. 3A, it can be determined that the item is positioned outside the product-scanning region. On the other hand, if the depth value indicates that the item is positioned closer than the distance indicated by line 320 as is shown in FIG. 3B, it can be determined that the item is positioned within the product-scanning region. Additionally, the position of the item within the FOV can be considered to further help with the determination. For instance and with reference to FOV 304, the FOV can be divided into a series of regions. If the item is determined to be at a distance between the lines 320 and 310, and its position within the FOV indicates that it is positioned near the left edge, then such a distance value in combination with such position value would indicate that the item is within the product-scanning region. In contrast, if the item is determined to be at a distance between the lines 320 and 310, and its position within the FOV indicates that it is positioned near the right edge, then such a distance value in combination with such position value would indicate that the item is outside the product-scanning region. Those of ordinary skill in the art will appreciate that a higher resolution of regions and depth values may yield a more accurate determination of wither the item is within the bounds of the product-scanning region or not.

Using the approaches described herein, items placed near the reader and within the view of the imaging assembly may avoid being scanned until truly presented for reading purposes. For example, if the item ends up being positioned as shown in FIG. 3A with a barcode visible to the imaging assembly, the reader may be configured to, responsive to determining that the item is outside the product-scanning region, either not transmit the image data to a decoder module or to abstain from transmitting the decoded payload of indicia to the host. In either case, from the point of view of the host, an item has not been read by the reader and thus a double count can be avoided.

However, it's worth noting that not all vision operations must be reduced based on an item being positioned outside the product-scanning region. For instance, regions like regions 312 may still be considered for, for example, wake-up purposes, direction detection, etc. As an example, if an item is detected outside the product scanning region the reader may remain in a relatively low operating mode and if an item is detected in the product-scanning region the reader can transition to a relatively higher operating mode. Differences between the who may include, for example, operating the illumination sub-assembly at a relatively lower or a relatively higher regime. Such determinations are within the scope of one of ordinary skill in the art and the key is that a reader may be operated pursuant to one set of parameters when an item if within the product-scanning region and pursuant to another set of parameters when the item is outside the product-scanning region.

Figure 3C:
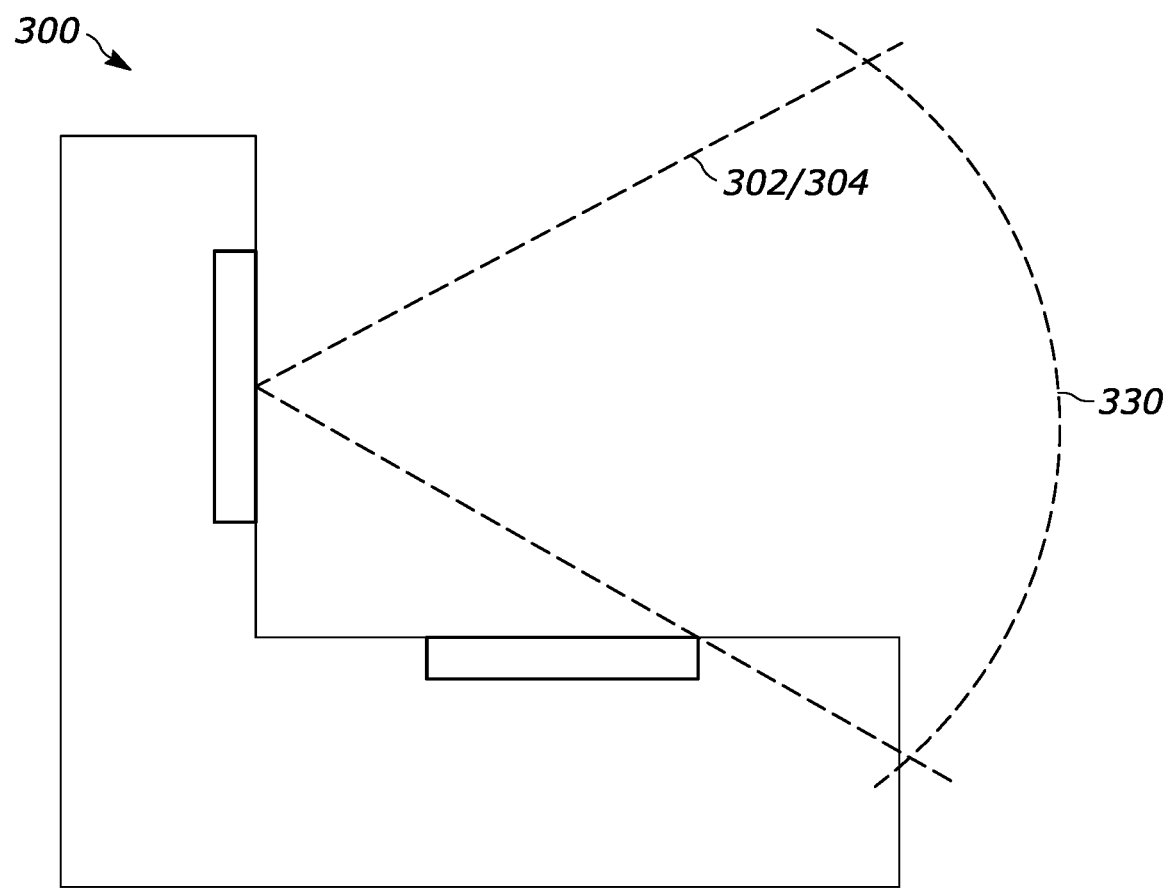
FIG. 3C illustrates a side view of the example bioptic barcode reader of FIGS. 3A, illustrating an arc of a spherical field of view.

In the example of FIG. 3C, the imaging system 300 has an FOV 302/304 that is angled (e.g., out of a top window for a bioptic system such as imaging system 300) and/or spherical. As such, the focus for an object may be consistent across a curve rather than along a straight line (e.g., as depicted by focus curve 330). As such, determining a distance based on a sharpness of an indicia (as described herein) may consider relative position within the FOV as well (e.g., using a predicted curve). In some implementations, the imaging system 300 is calibrated in the factory with predicted curves associated with the FOV (e.g., via a lookup table including different positions with an FOV, distances from the imaging assembly, and/or a map of sharpness values to use alongside the image data). Similarly, the imaging system 300 may record a grating blurriness (e.g., sharpness) determination for each point. In some implementations, calibrating the imaging system 300 for a single point is sufficient as indicating a sharpness value for the point, wherein known blur shift from that point can be used to determine sharpness at other locations. In some implementations, the imaging system 300 is calibrated as described above simultaneously or in conjunction with calibration of a camera or imaging assembly of the imaging system 300 (e.g., to calibrate the precise focus of the camera or imaging assembly).

Figure 4A:
FIG. 4A illustrates an example barcode with an edge to be used to determine a sharpness by an imaging device, such as those depicted in FIGS. 1A-3C.
Figure 4B:
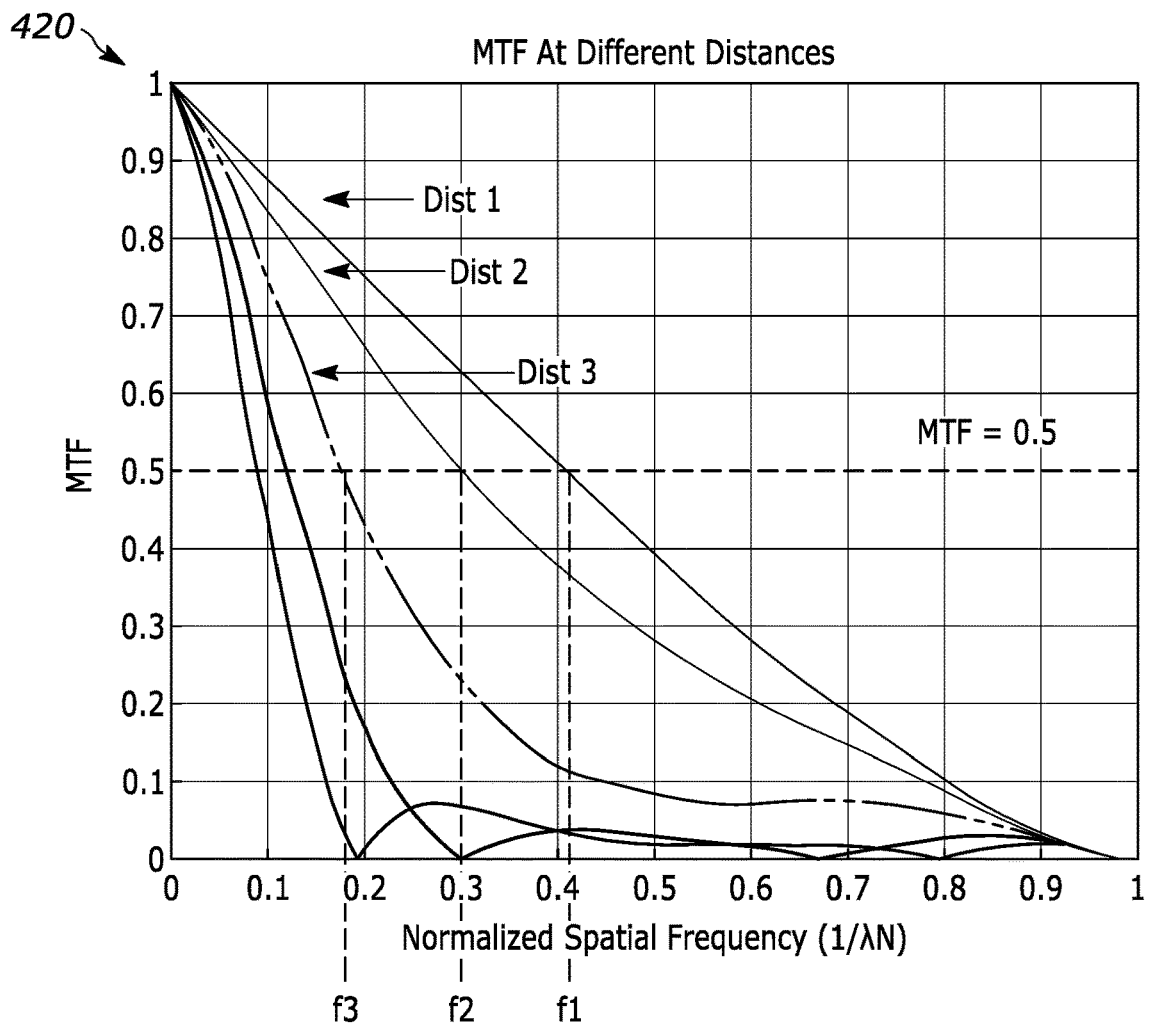
FIG. 4B illustrates an example modulated transfer function (MTF) of the barcode of FIG. 4A at different distances.
Figure 4C:
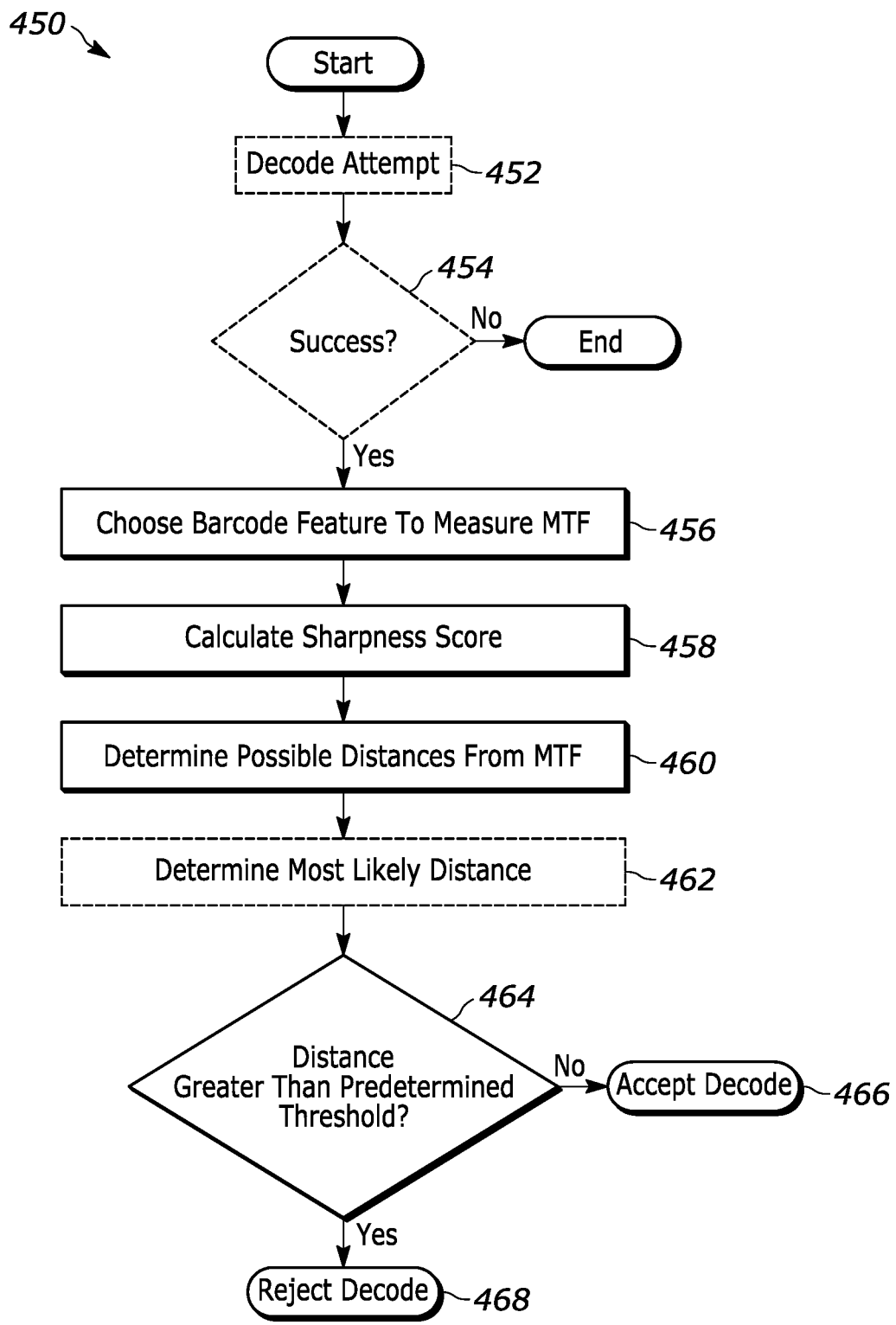
FIG. 4C illustrates a flow diagram of an example method for determining whether an indicia is within a decode operation range using an MTF of the indicia, to be implemented in an imaging device such as those depicted in FIGS. 1A-3C.

Referring next to FIGS. 4A-4C, indicia 400, and graph 450 depict an exemplary barcode and MTF graph representing an MTF for the barcode.

In some implementations, for an imaging device (e.g., imaging device 200), the amount of image blur is a function of the distance from the lens to the target (e.g., object 118). The amount of blur can be quantified at a given distance by the modulation transfer function or MTF of the imaging device 200. The higher the MTF value at a given frequency, the more in-focus the image will be. The imaging device 200 can measure the MTF from an image using a single edge in the image (e.g., a white-to-black or black-to-white transition). In some such implementations, the imaging device 200 measures the MTF from an edge using a slanted-edge method.

By measuring the MTF of a target image and knowing the expected MTF as a function of distance, the imaging device 200 can measure the distance from the lens to the target. When the target includes an indicia (e.g., a decoded barcode), the edges of the indicia can be used to measure the MTF. The imaging device 200 can then compare the MTF to expected MTF values to determine the distance of the indicia from the lens. Once the imaging device 200 calculates the distance to the indicia, the distance can be used to either accept or reject the indicia.

In particular, an imaging device 200 starts the method 450 at block 452 by attempting to perform an indicia decode. At block 454, the imaging device 200 determines whether the decode is successful. If not, then the flow ends. Otherwise, if so, the flow proceeds to block 456, where the imaging device 200 selects a barcode edge to use to calculate the target MTF (e.g., as described in more detail below). In some implementations, the imaging device 200 chooses an edge that is between larger elements of the barcode (e.g., a wide space next to a wide bar). An example of a chosen barcode edge 410 is illustrated in FIG. 4A for a 1D barcode where the outlined region of chosen barcode edge 410 can be used to measure the MTF using, for example, the slanted edge method. In further implementations, for 2D barcodes, barcode finder features (e.g., L-pattern for DataMatrix, bullseye for QR, Aztec bullseye, etc. . . . ) can be used to locate an appropriate edge.

For improved measurement accuracy, the imaging device 200 can utilize multiple edges in the image to combine multiple MTF measurements to calculate a sharpness score at block 458. For example, in some implementations, the imaging device 200 may calculate the sharpness score by averaging the MTF measurements from multiple edges in the image.

At block 460, once the sharpness score (e.g., an MTF curve) is calculated from the indicia edge(s), the measured MTF values are compared to the expected values to determine the distance from the lens to the barcode. Graph 420 depicts an example of expected MTF curves at various distances.

In some implementations, rather than compare and store the full MTF curves, the imaging device 200 stores and/or compares certain values. For example, in some such implementations, the imaging device 200 stores and compares the normalized spatial frequency at which the MTF curve value is 0.5 (e.g., 50% modulation). As graph 420 illustrates, at distance Dist the 50% MTF frequency is f1, at distance Dist2 the 50% MTF frequency is f2, and at Dist3 the 50% MTF frequency is f3.

In some implementations, the imaging device 200 can measure the same MTF values at two different distances. For example, if the imaging system is focused to 8 inches from the lens, the same MTF value can happen at further than 8 inches (e.g., 12 inches) and closer than 8 inches (e.g., 4 inches). In some such cases, the imaging device 200 proceeds to block 462 and determines a most likely distance. Depending on the implementation, the imaging device 200 uses additional information in the image to disambiguate between the multiple possible distances to choose the most likely distance. For example, the imaging device 200 may determine that image brightness (e.g., as determined via a contrast, as described in more detail herein) at a closer distance would be higher than the further distance due to an illumination source for the imaging device 200 being close to the lens. If the image brightness is over a certain value, the imaging device 200 can therefore determine that the barcode is at the closer distance. Another example is the size of the expected barcode in the field-of-view. For example, a UPC barcode would take up more of the field-of-view at the closer distance. Another example is detecting that the barcode is in a stationary location within the field-of-view in multiple sequential images. For some imaging devices, such as a bioptic scanner, the imaging device may then determine that the barcode is further (e.g., away past the a platter of the imaging device).

In further implementations, the imaging device 200 may further consider a reduction of MTF due to motion blur at high scanning speeds. For example, the imaging device 200 can calculate the motion blur by estimating the speed and direction of the indicia using two sequential images and then determining a total amount of image blur expected in the calculations based on such.

Once the distance to barcode is determined from the sharpness score (e.g., via the MTF measurement), the imaging device 200 can use the distance to either accept (e.g., at block 466) or reject (e.g., at block 468) the indicia decode. For example, if the distance is greater than a predetermined value, the imaging device 200 can reject the indicia.

Figure 5:
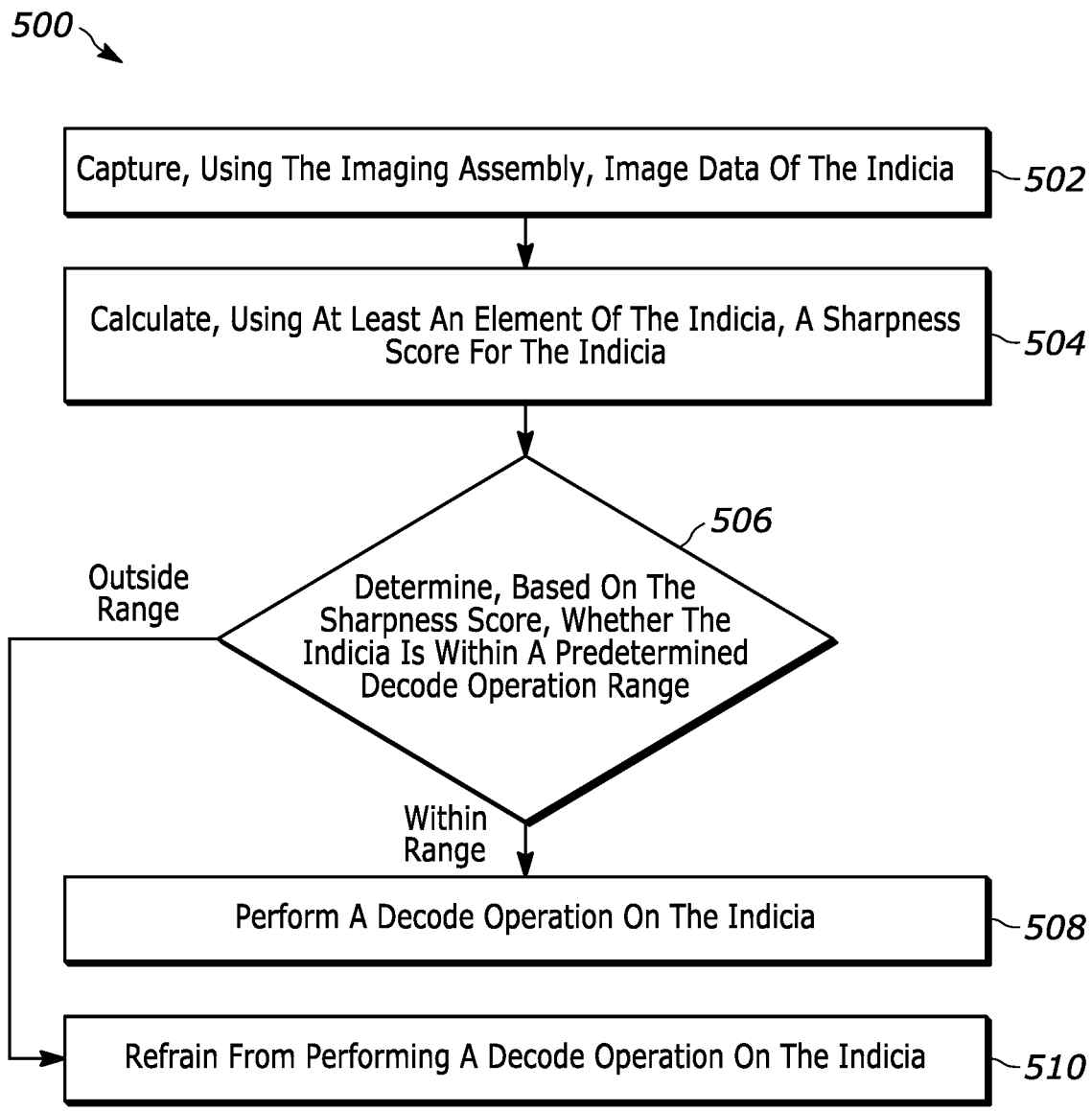
FIG. 5 illustrates a flow diagram of an example method for determining whether an indicia (e.g., on an object and/or item as illustrated in FIGS. 2-3B) is within a decode operation range based at least on a sharpness of the indicia, to be implemented in an imaging device such as those depicted in FIGS. 1A-3C.

Referring next to FIG. 5, the method 500 illustrates a flow diagram of an example method for determining whether to an indicia (e.g., on an object, such as object 118) is within a predetermined decode operation range (e.g., as described above with regard to FIGS. 3A-3C). Although the method 500 is described below with regard to imaging device 200 and components thereof as illustrated in FIG. 2, it will be understood that other similarly suitable imaging devices and/or components may be used instead.

At block 502, the imaging device 200 captures image data including the indicia using the imaging assembly. In some implementations, the imaging device 200 captures the image data responsive to the indicia and/or an object with the indicia (e.g., object 118) entering a FOV of the imaging device 200. In other implementations, the imaging device 200 constantly captures a stream of image data.

At block 504, the imaging device 200 calculates, using at least an element of the indicia, a sharpness score for the indicia. In some implementations, the imaging device 200 uses multiple edges in the indicia to determine the sharpness score (e.g., such that more clear edges meaning a higher sharpness score). In further implementations, the imaging device 200 first selects the element of the indicia. For example, the imaging device 200 can decode the indicia in the captured image data to generate a decoded indicia (e.g., decoded indicia information). Using the decoded indicia, the imaging device 200 can select the element to use for calculating the sharpness score.

In some such implementations, the imaging device 200 selects the element based on an indicia type of the decoded indicia. For example, if the decoded indicia is a 1D barcode, the imaging device 200 may select a tallest and/or widest bar of the barcode, a portion of the barcode with a greatest amplitude, a densest portion of the barcode, etc. Similarly, if the decoded indicia is a 2D barcode (e.g., a QR code indicia, Data Matrix indicia, Maxi Code indicia, etc.), the imaging device 200 may select an expected pattern and/or predetermined symbol (e.g., a finder pattern square or design for a QR code indicia, a timing pattern bar for a Data Matrix indicia, a finder pattern for the Maxi Code, etc.) in the 2D indicia. As another example, if the decoded indicia is a 2D barcode with a solid finder pattern (e.g., a Data Matrix indicia), the imaging device 200 may select the finder pattern line. In further implementations, the imaging device 200 selects the element of the indicia such that the selected element has the highest modulation of one or more modulations associated with one or more elements of the indicia (e.g., according to an MTF operation). In still further implementations, the imaging device 200 uses image recognition techniques to select an element of the indicia as described above without actually decoding the indicia.

In some implementations, a highest sharpness score occurs based on a point of focus for an imaging assembly and/or calibration (e.g., at manufacture) of the imaging device 200. For example, the highest sharpness score can occur at a halfway point of the predetermined decode range (e.g., 4 inches of an 8 inch range), farther from the imaging assembly than the halfway point (e.g., 5 inches of an 8 inch range), or closer to the imaging assembly (e.g., 3 inches of an 8 inch range), than the halfway point.

In some implementations, calculating the sharpness score includes performing a modulated transfer function (MTF) using at least an element of the indicia (e.g., the selected element as described above). The MTF represents the spatial frequency response of a linear imaging system. In some such implementations, performing the MTF includes determining a magnitude of the Fourier transform of a system impulse response (e.g., the point spread function (PSF)). In further implementations, the imaging device 200 calculates the sharpness score using the modulated transfer function. In some implementations, the MTF is calculated using a slanted edge method. In further implementations, the imaging device 200 using a slanted edge method is able to image and/or detect an edge in the indicia with a higher resolution (e.g., with sub-pixel resolution).

The imaging device 200 performs the slanted edge method for calculating the MTF by capturing a number of closely spaced points aligned in a row (e.g., a line in the image data) before collapsing the line into a unidimensional line spread function to obtain the MTF in the direction perpendicular to the line. A set of contiguous such lines may be referred to as an "edge" for the MTF operations described herein. In further implementations, the raw data intensities of such a two dimensional edge is projected onto a one dimensional line perpendicular to the edge, producing an intensity profile (e.g., an edge spread function (ESF)). The imaging device 200 may then derive a derivative of the profile (e.g., the line spread function (LSF)) and subsequently perform a Fourier transform on the derivative to generate the MTF curve (e.g., depicting a normalized frequency vs. a normalized MTF value). In further such implementations, the edge is slanted (e.g., 4 degrees, 6 degrees, 10 degrees, etc. off the horizontal or vertical) and/or of a predetermined length (e.g., at least 10 pixels long, at least 50 pixels long, at least 100 pixels long, at least 150 pixels long, etc.). In some implementations, the sharpness score, then, is representative of a blurriness (e.g., sharpness) of an object (e.g., the object 118) in the image, and is calculated as the localized average of the performance of the imaging device 200 along the length of the edge (e.g., the normalized average MTF value). In further implementations, when the imaging device 200 has determined the angle, the imaging device 200 generates the MTF curve using one or more angle values of the element(s) (e.g., to determine subpixel values for generating the MTF curve).

In some implementations, the indicia includes multiple edges that are not parallel to one another. The imaging device 200 may then estimate an angle of the element(s) based on the edges of the element(s) in the captured image data (e.g., by averaging the angles of the elements, determining a most common angle, determining a median angle, etc.). The imaging device 200 may then determine an edge shift value of and/or between the element(s).

In still further implementations, the indicia moves through the FOV, leading to motion blur that can cause errors in determining distance-based blur (e.g., sharpness) of the indicia. In some such implementations, the imaging device 200 captures multiple frames and estimates a velocity of the indicia based on the frames to determine blur and/or distance of the indicia.

At block 506, the imaging device 200 determines, based on the sharpness score, whether the indicia is within a predetermined decode operation range. In implementations in which the indicia is within the predetermined decode operation range, flow proceeds to block 508. Otherwise, in implementations in which the indicia is not within the predetermined decode operation range, flow proceeds instead to block 510.

In some implementations, the imaging device 200 determines a distance from the imaging assembly to the indicia based on the sharpness score. In some implementations, the imaging device 200 determines the distance by performing a lookup on a stored table with various modulated transfer function output values (e.g., sharpness scores). In further implementations, the imaging device 200 determines whether the indicia is within the predetermined decode operation range based on whether the distance is above or below a predetermined threshold.

In further implementations, the imaging device 200 additionally or alternatively determines whether the indicia is within the predetermined decode operation range based on a determined contrast of components of the indicia. For example, in some implementations, the imaging device 200 estimates and/or calculates a contrast between elements (e.g., white and black elements) for indicia that are moving in the FOV at high speed. For example, if an indicia moves at sufficient speeds through the FOV, the imaging device 200 may calculate a sharpness score corresponding to a greater distance from the imaging assembly than the imaging device 200 would otherwise normally calculate. In such implementations, the imaging device 200 may additionally calculate contrast between two elements (e.g., two selected elements of the indicia, the selected element and a background of the indicia, etc.) and determine if the contrast is above a predetermined threshold. In some such implementations, the contrast is above the predetermined threshold when an overall amplitude from a brightest portion of the indicia to the darkest portion of the indicia (e.g., a brightest white element to a darkest black element).

In some such implementations, if the contrast is above the predetermined threshold, the imaging device 200 may perform the decode operation at block 508 even if the imaging device 200 determines that the object is not within the predetermined decode range based on the sharpness score of the object. As such, the imaging device 200 may utilize the contrast as a secondary check (e.g., to ensure that indicia are not incorrectly classified as too far away for a decode operation). In further implementations, the imaging device 200 may utilize the contrast as a preliminary check (e.g., before checking for sharpness) and/or as an alternative check.

In further implementations, the imaging device 200 determines one or more characteristics of the indicia (e.g., a relative density of the indicia, a module size of the indicia, a type of indicia, etc.) based on the determined distance. The imaging device 200 may use the characteristics to perform additional operations (e.g., to detect ticket switching attempts, detect sweethearting attempts, detect proximity of other elements, etc.). In some such implementations, the imaging device 200 generates and/or populates a database including the one or more characteristics of the indicia for later lookup operations. The imaging device 200 may reference the database when a known density is detected and/or when no slanted edge is available. For example, if the imaging device 200 determines that the indicia is an 80% UPC indicia based on a measured density, the imaging device 200 can then measure the pixels across (e.g., due to a known size) and determine a distance away from the imaging assembly. In some such implementations, if the density is not sufficient to determine a distance away from the imaging assembly, the imaging device 200 may perform the methods described herein to determine a distance and/or utilize another factor as described herein. In still further implementations, the imaging device 200 determines whether the indicia is within the predetermined decode range (e.g., by determining whether the calculated distance is correctly determined to be in or outside of the predetermined decode range).

At block 508, the imaging device 200 performs a decode operation on the indicia. At block 510, the imaging device 200 refrains from performing a decode operation on the indicia. In some implementations, the decode operation is an actual decode of the indicia. In other implementations, the imaging device 200 decodes the indicia prior to selecting an element for performing the calculating the sharpness score. In such implementations, the decode operation may then be or include transmitting the data retrieved by decoding the indicia (e.g., from a decode module on an application-specific integrated circuit (ASIC) of the imaging device 200 to another component of the imaging device 200 and/or a computing device communicatively coupled to the imaging device 200. In further implementations, the decode operation is transmitting information for decoding the indicia to another component and/or device (e.g., an ASIC of a communicatively coupled device).

In some implementations, the imaging device 200 selects a first element of the indicia for calculating the sharpness score but does not calculate the sharpness score with the indicia (e.g., because the imaging device 200 determines that the first element is too small, the lighting is too difficult to decode in, the contrast is wrong, etc.). Depending on the implementation, the imaging score 200 may determine that the first element is unsuitable for calculating a sharpness score when the bar is element is too short (e.g., less than 10 pixels long, less than 50 pixels long, less than 100 pixels long, etc.), too long (e.g., more than 500 pixels long, more than 750 pixels long, more than 1000 pixels long, etc.), too narrow (e.g., less than 1 pixel wide, less than 5 pixels wide, less than 10 pixels wide, etc.), etc. Depending on the implementation, the imaging device 200 determination that an element is unsuitable for calculating a sharpness score is device-specific. In some such implementations, the imaging device 200 selects a new element of the indicia. In some implementations, the system 200 determines to discard the captured image data and cause the imaging device 200 to capture new image data including the indicia.

Figure 6:
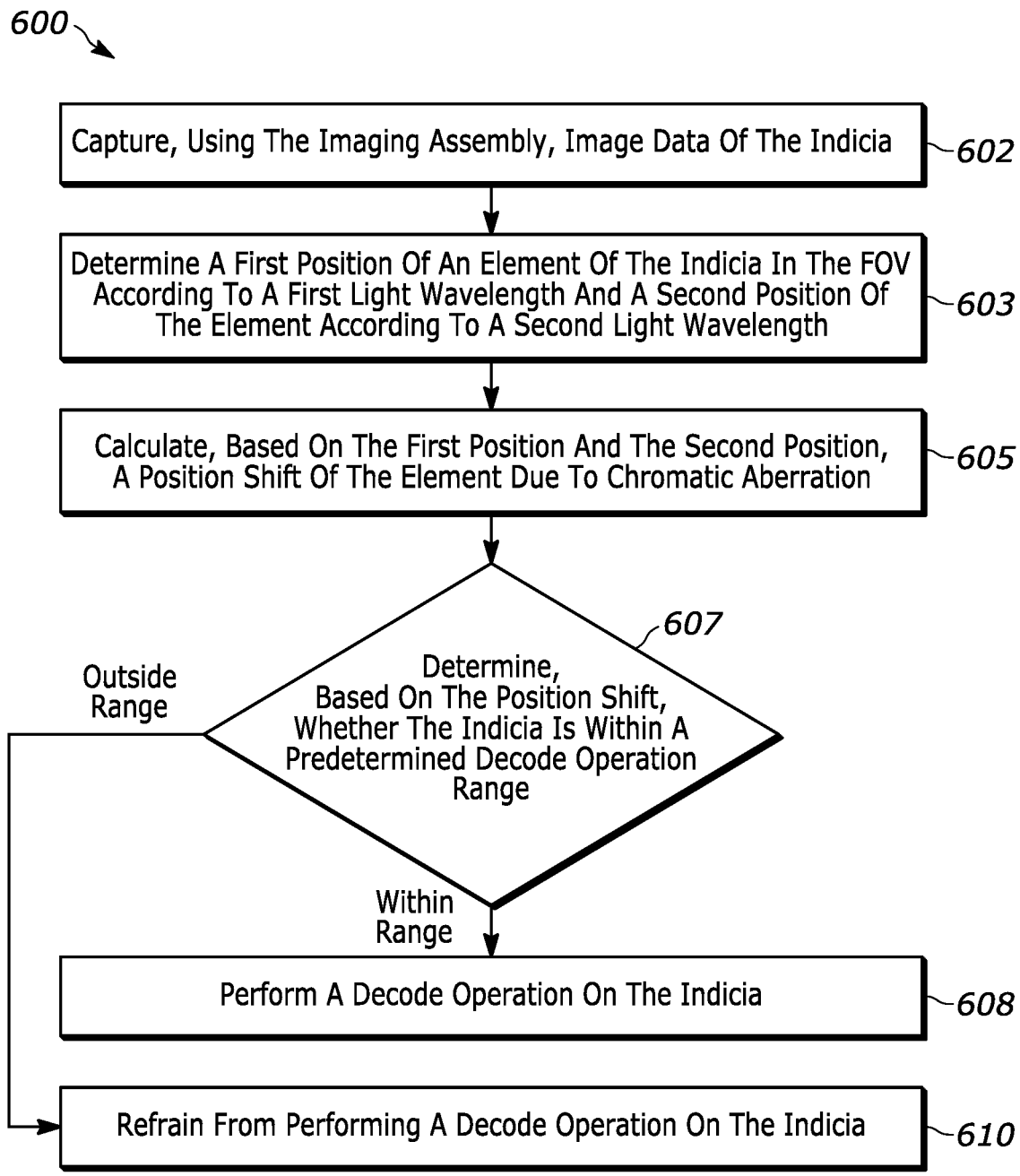
FIG. 6 illustrates a flow diagram of an example method similar to that of FIG. 5, but in which the imaging device makes the determination of whether the indicia is within the decode operation range based at least on a position shift of the indicia.

Referring next to FIG. 6, the method 600 illustrates a flow diagram of an example method for determining whether to an indicia (e.g., on an object, such as object 118) is within a predetermined decode operation range (e.g., as described above with regard to FIGS. 3A-3C). Although the method 600 is described below with regard to imaging device 200 and components thereof as illustrated in FIG. 2, it will be understood that other similarly suitable imaging devices and/or components may be used instead.

In some implementations, blocks 602, 608, and 610 are similar to blocks 502, 508, and 510. As such, implementations and examples described with regard to the method 500 of FIG. 5 may apply as appropriate to the method 600 of FIG. 6.

At block 603, the imaging device 200 determines a first and second position of an element of the indicia in the FOV. In particular, the imaging device 200 determines the first and second position according to a first light wavelength and a second light wavelength, respectively. When capturing an image, chromatic aberrations in the imaging assembly will cause the different colors of light to refract differently. In some implementations, the imaging device 200 determines the first and second positions using the same frame (e.g., when the imaging device 200 includes a color sensor) or using multiple frames (e.g., when the imaging device 200 includes multiple monochrome sensors).

At block 605, the imaging device 200 calculates a position shift of the element due to chromatic aberration based on the first position and the second position. In particular, an imaging device 200 with a color sensor and/or with multiple monochrome sensors can receive light and determine a position shift of the indicia based on the refracted wavelengths.

At block 607, the imaging device 200 determines whether the indicia is within a predetermined decode operation range based on the position shift, similar to block 506 of FIG. 5 above. In particular, the imaging device 200 may similarly determine whether the position shift is above a predetermined threshold to determine whether the indicia is within the predetermined decode operation range.

Embodiments of the present disclosure may have certain advantages over traditional approaches. For example, using a single assembly to provide both aiming light and a decode indication can reduce complexity, footprint, costs, etc. Similarly, providing a visible decode indication using the aiming light may improve a rate at which users recognize the indication, as auditory cues may be missed in a noisy or busy environment and an illumination system has a large FOV across which the system projects light, diffusing the light and reducing overall visibility.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device, comprising:
an imaging assembly configured to capture image data of an indicia appearing in a field of view (FOV); and
a computer-readable media storing machine readable instructions that, when executed, cause the imaging device to:
  capture, using the imaging assembly, the image data of the indicia;
  determine a first position of an element of the indicia in the FOV according to a first light wavelength and a second position of the element in the FOV according to a second light wavelength;
  calculate, based on the first position and the second position, a position shift of the element due to chromatic aberration;
  determine, based on the position shift, whether the indicia is within a predetermined decode operation distance range;
  when the indicia is within the predetermined decode operation distance range, perform a decode operation on the indicia; and
  when the indicia is not within the predetermined decode operation distance range, refrain from performing the decode operation on the indicia.

2. The imaging device of claim 1, wherein the imaging assembly includes a color imaging sensor, and the first light wavelength and the second light wavelength are received in a single frame.

3. The imaging device of claim 1, wherein the imaging assembly includes a monochrome imaging sensor, the first light wavelength is of a first received light received in a first frame, and the second light wavelength is of a second received light received in a second frame.

* * * * *